July 31, 1962 H. W. STRATFORD 3,047,215
APPARATUS FOR SEPARATING LIQUIDS OF DIFFERENT DENSITIES
Filed July 16, 1959 4 Sheets-Sheet 1
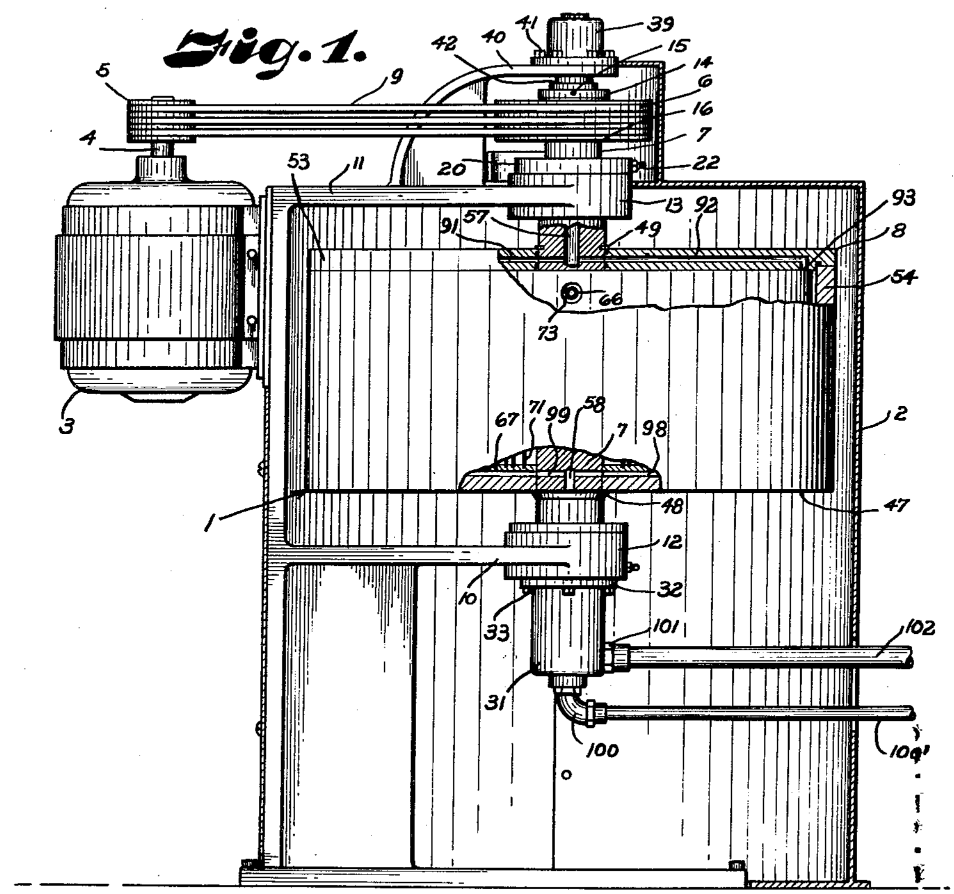
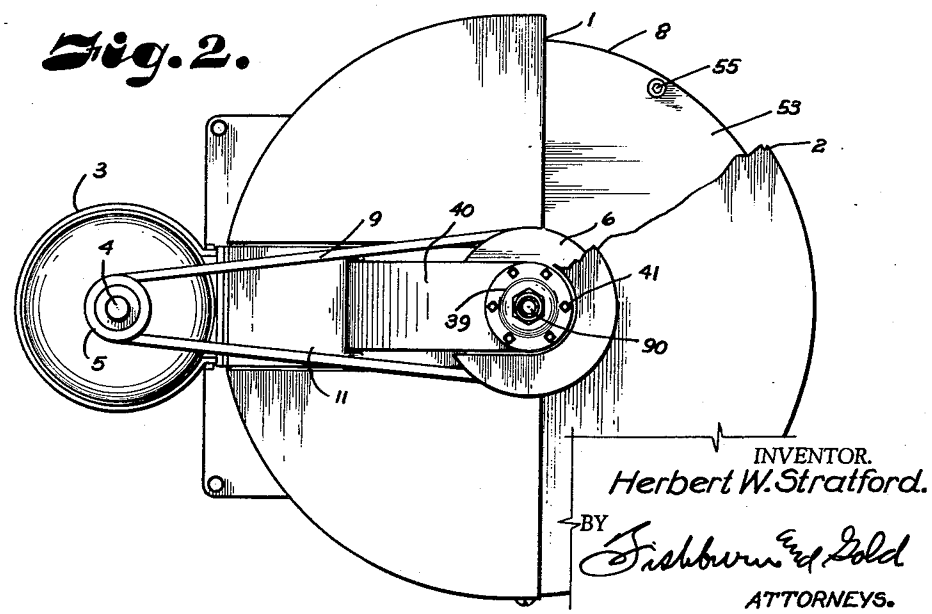
INVENTOR.
Herbert W. Stratford.
BY Fishburn and Gold
ATTORNEYS.

APPARATUS FOR SEPARATING LIQUIDS OF DIFFERENT DENSITIES
Filed July 16, 1959 4 Sheets-Sheet 2
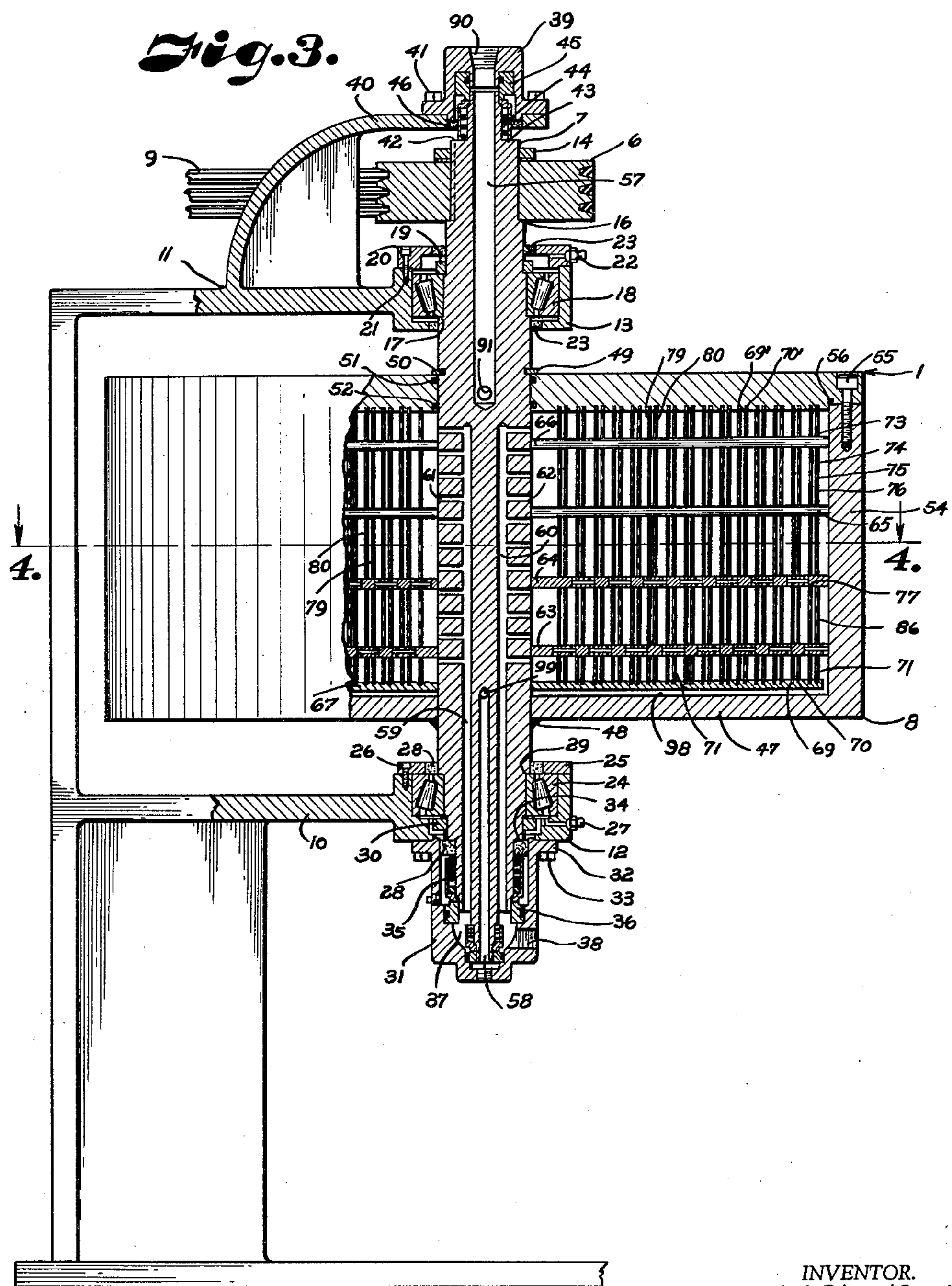
INVENTOR.
Herbert W. Stratford.
BY
Fishburn & Gold
ATTORNEYS.

INVENTOR.
Herbert W. Stratford.
BY
Fishburn & Gold
ATTORNEYS.

July 31, 1962 H. W. STRATFORD 3,047,215

APPARATUS FOR SEPARATING LIQUIDS OF DIFFERENT DENSITIES

Filed July 16, 1959 4 Sheets-Sheet 4

INVENTOR.
Herbert W. Stratford
BY
Fishburn and Gold
ATTORNEYS.

United States Patent Office 3,047,215

Patented July 31, 1962

3,047,215

APPARATUS FOR SEPARATING LIQUIDS OF DIFFERENT DENSITIES

Herbert W. Stratford, Leawood, Kans., assignor to H. W. Stratford Company, Inc., Kansas City, Mo., a corporation of Missouri Filed July 16, 1959, Ser. No. 827,497
10 Claims. (Cl. 233—31)

This invention relates to a phase separator and to a device of this character used in separating any miscible or immiscible liquids having two or more different specific gravities, and more particularly to the separation of such liquid traveling in parallel relation.

Heretofore, in separation of various liquids of the character here involved, the liquids are caused to travel countercurrently with respect to each other while passing through a rotor. The purpose of such countercurrent exchange is to secure solvent action of one of the liquids upon a constituent or constituents held in solution in the other.

With such types of countercurrent flow of liquids, it has been common practice to provide a plurality of concentric partitions or cylindrical bands positioned within the rotor. In such instances, the bands are perforated so that countercurrent exchange between the liquids treated by the machine is obtained when the liquids pass through the perforations and when the liquids contact each other in the area between the bands.

It is the principal object of the present invention to provide a phase separator having a rotor provided with a plurality of eccentric bands to promote rapid separation of the liquids and keep them separated while the liquid is flowing in parallel relation through the separator.

It will be obvious that the apparatus which I have devised is applicable in the washing and extracting arts, such as the refining of hydrocarbon oils wherein the fluids may be pure substances or they may consist of fluid mixtures as distinguished from solids. Although some solids particles may be mixed with the liquids, the apparatus primarily is adapted for liquids as distinguished from solids.

Other objects of the present invention are to provide a rotor having a plurality of spaced partitions therein wherein the spaces between the partition on one side of the rotor will be greater than on the opposite side of the rotor; to provide the partitions in the rotor in such a manner that the center of the space between two positions will be concentric to the axis of the rotor but the partitions will be inclined outwardly from each other from one side of the rotor and inclined inwardly towards the opposite side of the rotor in the other direction so that the walls forming the spaces around the rotor will be eccentric to the axis of the rotor.

My phase separator is adapted for treating relatively light and heavy fluids, such as hydrocarbon oils with certain selected solvents or aromatic constituents therefor. Some examples are sulfuric acid and a hydrocarbon; a hydrocarbon and furfural, caustic and a hydrocarbon, and water and any hydrocarbon.

A further object of my invention is to provide an improved separator wherein the liquids separate, and once separated are thereafter kept in separated relation, as distinguished from again being dispersed and mixed with other fluids as is common practice.

Another object of the present invention is the adapability for a sulfuric acid alkylation process wherein the alkylation reaction is conducted in very tight emulsion condition in the reactor. I have found that my apparatus will improve the alkylate quality and higher yield with lower acid and caustic consumption, thus reducing fouling in fractionation towers as is the present practice and substantial elimination of the side product of polymerization, as well as reduction in acid in the system and rapid control of alkylation acid strength.

Other objects of the invention will be apparent from the following description taken in connection with the drawings forming a part of this specification.

In accomplishing these and other objects of the invention I have provided improved details of structure, the preferred forms of which are shown in the accompanying drawings, wherein:

FIG. 1 is a side view of my separator with parts broken away to better illustrate the invention.

FIG. 2 is a partly fragmentary top view thereof.

FIG. 3 is a vertical cross-sectional view through a part of the rotor assembly.

Figure 4:
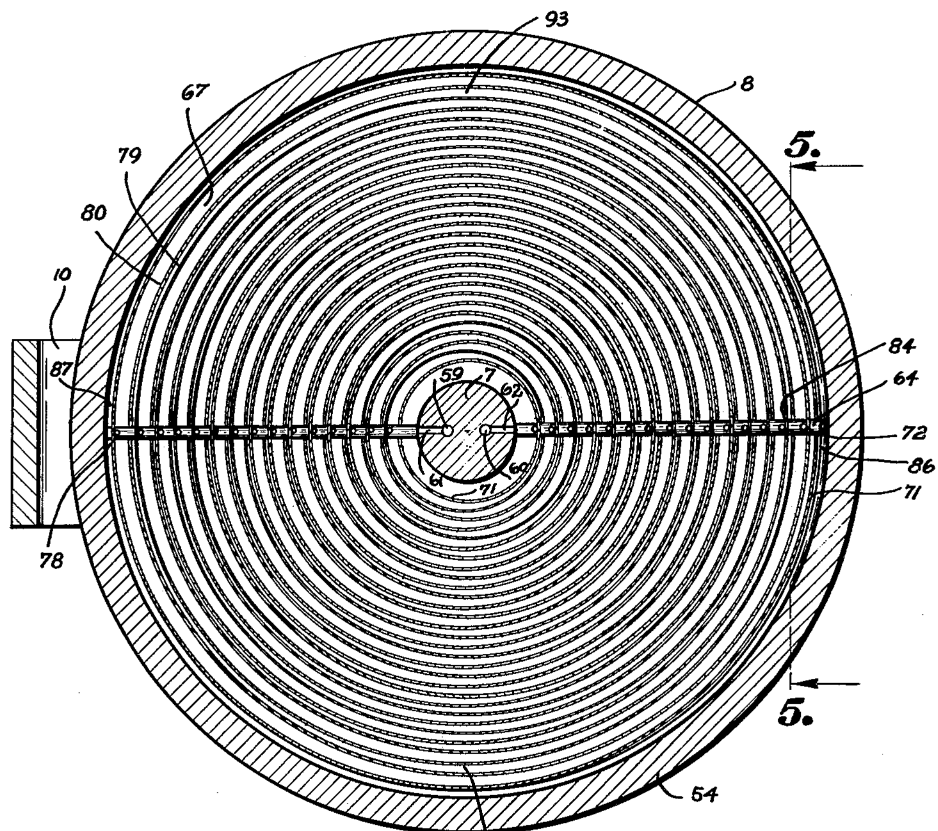
FIG. 4 is a cross-sectional view particularly illustrating the partitions in the rotor and their position eccentric to the axis of the rotor taken on a line 4—4, FIG. 3.
Figure 5:
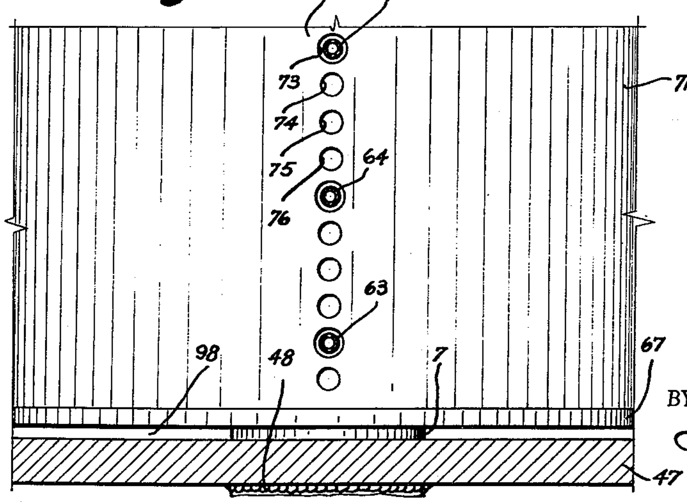
FIG. 5 is an enlarged sectional view taken on a line 5—5, FIG. 4.

Referring more in detail to the drawings:

1 designates a separator embodying the features of my invention consisting of a housing or outer casing 2, upon one side of which is mounted a motor 3 having a shaft 4 extending vertically thereof above the casing 2 provided with a pulley 5 aligning with a pulley 6 on a shaft 7 extending vertically into the casing 2 and upon which is mounted a rotor bowl 8. Drive belts 9 extend over the pulleys 5 and 6 for rotating the bowl as hereinafter shown.

The casing 2 has an arm 10 extending inwardly to substantially the center thereof for supporting the vertically extending shaft 7 at its lower end, and the shaft is supported near its upper end by the top portion or arm 11. The arm 10 and top portion 11 are enlarged at their inner ends and provide bearing housings 12 and 13 for supporting the shaft.

The pulley 6 mounted on the shaft 7 is held thereon by a collar 14 and set screw or the like 15, the lower side of the pulley engaging against a shoulder 16 on the shaft. The shaft has an enlarged portion forming a shoulder 17 and a bearing 18 surrounds the shaft and is held in place by a ring 19. The housing 13 has a cover 20 and is held thereon by stud bolts 21. A grease fitting 22 is provided in the side of the cover for supply of lubricant to the bearing. Leakage is prevented by packings 23, as well as preventing dust and dirt from entering the bearing.

The housing 12 for the lower bearing 24 also has a cover 25 held in place by stud bolts 26 and has a lubricant supply fitting 27. Lubricant retaining and dust prevention rings 28 are also provided around the shaft 7. The shaft is offset providing a shoulder 29 against which one side of the bearing 24 engages and a ring 30 supports the lower side thereof the same as the upper bearing. A housing 31 is provided for the lower end of the shaft and has a flange 32 provided with openings for receiving bolts 33 for securing the housing or cap to the bearing housing 12. The shaft 7 is recessed forming a shoulder 34 against which the lower sealing ring 28 is adapted to engage and the housing or cap 31 is larger than the shaft to accommodate a coil spring 35 having its lower end engaging against a bronze sealing ring 36, the sealing ring and lower end of the cap forming a chamber 37 around the shaft 7. The cap 31 has an opening 38 connecting with the chamber 37 for a purpose later described.

The upper end of the shaft 7 is also provided with a cap 39 which engages an extension 40 on the top portion 11 and is secured thereto by cap screws 41. The shaft 7 is offset as indicated at 42 forming a shoulder 43 against which a coil spring 44 engages and has its other end engaging a sealing ring 45 and a sealing ring 46 engages around the housing of the coil spring to prevent escape of lubricant and prevent dust from entering therein around the shaft.

The rotor 8 has a bottom 47 which is welded or otherwise suitably secured to the shaft 7 as indicated at 48 (FIG. 3). A keeper ring 49 engages in an annular groove 50 for assisting in retention of the rotor bowl on the shaft and sealing rings 51 and 52 are provided on the cover 53 around the shaft and the cover being secured to the sidewalls 54 by set screws or the like 55. A sealing ring 56 is provided at the top of the wall 54 between the cover and top edge, as illustrated in FIG. 3.

Now referring to the construction of the rotor bowl, which is operated on a vertical axis, and which is preferable in my phase separation, but which may also be constructed and operated on a horizontal axis if desired, the shaft 7 is provided with a vertical bore 57 extending from the top thereof and terminating substantially centrally of the cover member 53 of the rotor bowl. The lower portion of the shaft is also centrally bored as indicated at 58, and which extends upwardly to substantially even with the top side of the bottom 47 of the rotor. Spaced longitudinal openings 59 and 60 are provided in the shaft which extend from the chamber 37 to near the top of the rotor bowl but slightly spaced from the top 53 thereof, as illustrated in FIG. 3. The bore openings 59 and 60 are provided with a plurality of lateral openings 61 and 62 which intersect the openings 59 and 60, and which extend through the wall of the shaft and open into the rotor bowl. Spaced rods 63, 64, 65 and 66 are mounted upon the shaft between certain of the lateral openings 61 and 62 and extend to the sidewall 54 of the rotor bowl, also as illustrated in FIG. 3. The ends of the rods are suitably secured by welding or other means to the wall 54 of the bowl. Secured to the shaft 7 and spaced slightly from the bottom 47 is a separation disk 67 having its outer edge spaced from the wall 54 to allow the heavier liquid to pass therearound. The upper side of the separation disk 67 is provided with a plurality of spaced eccentric grooves as indicated at 69 and 70 for receiving the lower edges of a plurality of partitions or bands 71. The remaining partitions have not been numbered, but they are the same as the partitions 71, as will later be shown. The underneath side of the cover is provided with spaced grooves 69' and 70' for receiving the upper edges of the partitions 71. It will also be obvious that when the cover 53 is placed on the rotor bowl and the bolt 55 is in place with the sealing rings the lower edge of the partitions will be held firmly in the grooves in the separation disk and the tops thereof will be firmly held in the grooves 69' and 70' of the cover 53. The partitions 71 are at one side 72 provided with spaced openings as indicated at 73, 74, 75 and 76 with the rods 63, 64, 65 and 66 extending through the openings 73. The openings 73 in the wall 71 are larger than the rods, 63, 64, 65 and 66 to allow fluid to pass through the wall 71 and around the rods. Openings 77 are provided in the side 78 opposite the side 72 through which the rods extend and art tightly fit around the rods so that the liquid and fluid will not pass therethrough. The same is true of the remaining partitions as they progress inwardly with the exception that every other wall has the openings reversed so that at each side 72 and 78 a closed wall portion 79 faces an open wall portion 80 with the openings 73, 74, 75 and 76 therein.

Figure 6:
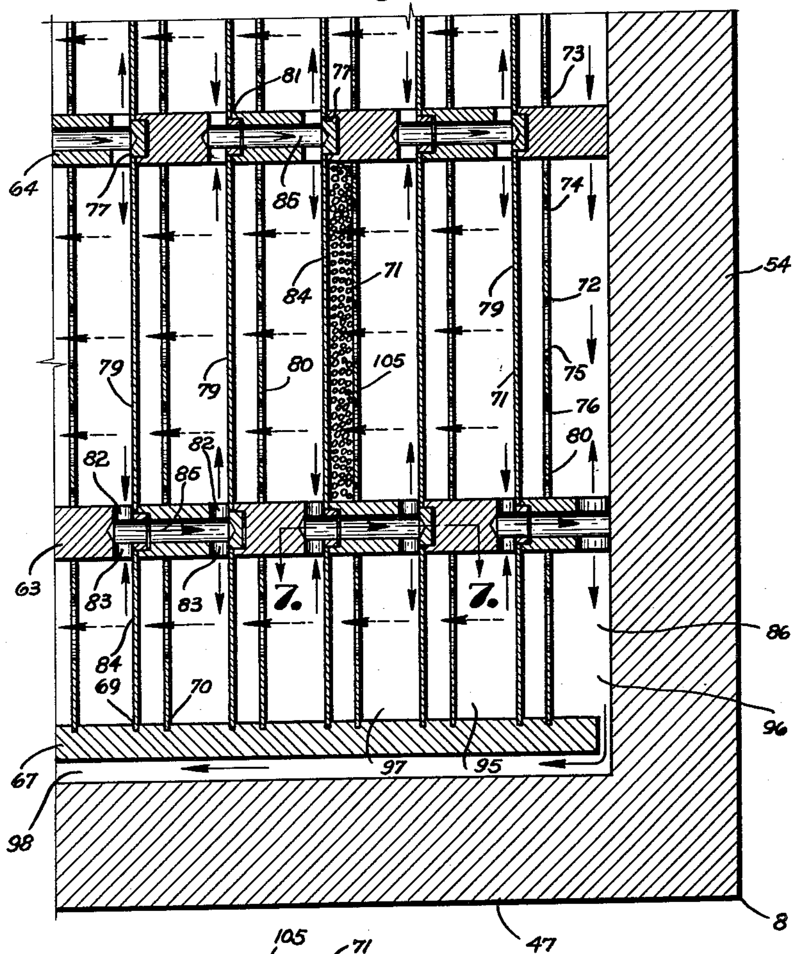
FIG. 6 is a fragmentary enlarged cross-sectional view particularly illustrating the flow of the liquids through the separator and the cellular material which may be used in between some of the partitions if desired.
Figure 7:
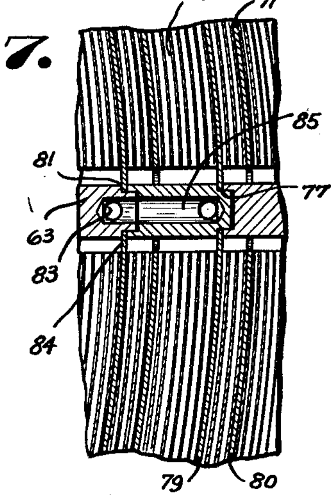
FIG. 7 is an enlarged cross-sectional view taken on a line 7—7, FIG. 6.

Referring to FIG. 6, it will be seen that the partitions 71 and the remaining inwardly stationed walls are inset in grooves 81 in the rods to provide a tight seal. It will be understood that at the opposing sides 72 and 78 every other one of the partitions is so affixed to the rods as each partition has not been given a specific number. Each of the rods 63, 64, 65 and 66 are provided with vertical openings 82 and 83 on the inner side 84 adjacent the closed wall portion 79 of the partitions 71. Every other two of the vertical openings in the rods are intersected by horizontal openings 85 for a purpose later described. While I have here shown three openings 74, 75 and 76 provided between the opening 73 in the partitions 71, any number may be used without departing from the spirit of my invention.

Referring particularly to FIG. 4, it will be noted that the outermost partition or wall 71 is spaced a larger distance from the sidewall 54 of the rotor bowl on the side 72 thereof as at 86 and the partition is spaced very slightly from the sidewall near side 78 as at 87. It will be noted that the next following partition is closer to the side 72 whereas the next one is again closer to the side 78 and so on, thus providing a different spacing between the partitions near the rods 63, 64, 65 and 66. In other words, there are always small and large spaces on each side of the shaft 7 between the respective pairs of partitions. Each wall is, therefore, set in the rotor eccentrically to the axis of the shaft 7 in an opposite arrangement. As far as applicant is aware, this is a new feature never before disclosed or practiced in this art and provides a better separation of liquids of different densities than any method now available.

In operation of the phase separator for separation of liquids the motor, which is a variable speed motor, is energized to rotate the rotor bowl from 100 to 3000 r.p.m. I have found that a speed of 900 r.p.m. is suitable for my purpose in most instances.

The liquid which is to be treated in my separator is admitted to the apparatus through the connection 90 at the top of the shaft and flows through the bore opening 57 which is intersected in the cover 53 by openings 91 and 92 which lead to the spaces 93 and 94 (FIG. 4) which are 90° apart from the sides 72 and 78, thereby admitting the fluid to be treated at the outer portion of the rotor bowl. By reference to FIG. 6 it will be seen that the horizontal bores 85, in the rods 63, 64, 65 and 66 intersected by the vertical openings therethrough as indicated at 82 and 83 are offset one from the other vertically. In other words, the lower rod 63 has a fluid connection extending from a chamber 95 to a chamber 96, whereas the rod 64 has a fluid connection from a chamber 97 to chamber 95 and so on with the same arrangement between rods 65 and 66.

With the rotor bowl rotating the liquid entering in the spaces 93 and 94 the heavier liquids will tend to move to the outside of the bowl as indicated by the arrows with heavy lines, and the lighter liquids will move progressively inwardly through the openings 73, 74, 75 and 76 in the walls of the partitions as indicated by the arrows with broken lines. The liquid entering the outside of the outer wall 71 through said openings will be completely circulated around the rotor and the heavy liquids flow through the vertical openings (FIG. 6) in the rods and pass between the partitions towards the wall 54 and then downwardly towards the separation disk 67. When all of the heavier materials have been completely separated they follow the path or space 98 underneath the separation disk which intersects through a bore 99 with the bore opening 58 in the shaft leading to a connection 100 and line 100' to a source of storage. The lighter liquids travel inwardly towards the shaft 7 by passing through the spaced openings 73, 74, 75 and 76 in the walls or partitions 71 thereof and move progressively inwardly towards the shaft 7. After the light liquid has traveled inwardly it moves through the spaced transverse openings 61 and 62 in the rotor shaft and moves through the bores 59 and 60 in the shaft and collects in chamber 37 in the cap 31. A connection 101 is attached to the opening 38 in the chamber and a line 102 leads therefrom and may be connected to a back pressure regulator (not shown) for providing a back pressure on this line through which the light phase of the liquid escapes to maintain a hydraulic balance within the bowl for controlling the separation.

More specifically, liquid of heavier density will move to the outside or the inner wall 84 of the partition 71. The heavier phase as it moves around will flow through the vertical openings in the rods to the space 93 below the disk 67, as previously stated. The light fluids will move inwardly through the openings 73 surrounding the rods and openings 74, 75 and 76. Simultaneously the heavy liquid moving to the outside or wall 54 will pass through the openings 82, 83 and 85 from the chamber 97 to the chamber 95 until it reaches the outermost chamber 96.

With this movement of liquids through the separator the liquids move parallel instead of countercurrent. I have found that a back pressure of substantially 100 pounds on the line 102 operates very satisfactorily, particularly when treating hydrocarbon material with sulfuric acid. The higher the back pressure the less heavy material remains in the machine. With a lower back pressure more heavy material remains. I have further found that with the back pressure of 100 pounds for a hydrocarbon and an acid sludge the specific gravity ratio is .9 to 1.50. It will be obvious that when changing the speed of the motor the back pressure regulator must be changed to keep the materials in hydraulic balance.

It will be obvious that the heavier liquid passing outwardly and the lighter liquid moving inwardly toward the axis of the rotor will not mix with one another after they have once been separated, the centrifugal force forcing the heavy liquid outwardly and the pressure forcing the light liquid inwardly transcending the rotary effect and the force of gravity. Due to the fact that there is a substantial greater area of space on one side of the rotor between the partitions than there is on the other side, the liquid will be moved at a greater speed in the lesser space areas than in the greater space areas.

It has been found that with a rotor bowl of substantially 30 inches diameter and approximately 26 inches in depth the capacity will be approximately 100 gallons per minute through the machine.

In some instances it might be desirable to place between some or all of the partitions a cellular material. Such a material suitable for my purpose is a sandwich structure having a plurality of spaced plane layers with corrugated layers between adjacent plane layers and the crests of the corrugations engaging said plane layers, said layers being made of a crystalline material such as ceramic. Such sandwich structure is sold by Corning Glass Works and is known by the trade name Cercor 9690, having approximately 10 square feet of wall space to 1 cubic inch of material, the purpose being to add greater coalescing surface for the liquid to pass through to cause greater separation.

It will be obvious the rate of flow of liquid through any one of the space sections is either accelerated or decelerated, and through such acceleration or deceleration the change which takes place is accomplished. With my apparatus a rapid acceleration is followed by a slow or deceleration of the liquids. The spacing of the bands or partitions with respect to each other as they progress inwardly need not necessarily be uniform but may be increased or decreased as the liquids being separated dictate.

It will further be obvious from the foregoing that I have provided an improved phase separation wherein the bands or partitions in the rotor bowl are eccentric to the axis of the rotor for a purpose not heretofore utilized and the separation of liquids of different densities in a manner not heretofore known.

What I claim and desire to secure by Letters Patent is:

1. Apparatus for parallel exchange between liquids of different densities comprising, a rotor including a bowl, a plurality of radically spaced partition walls within the rotor bowl with adjacent partitions eccentric to the rotor axis in diametrically opposed relation, said partitions defining spaces therebetween with said spaces of progressively increased width from one side to the diametrically opposite side of the rotor axis with the greatest width of one space being on the opposite side of the axis to the greatest width of the next adjacent space, means supplying liquids to be separated to the rotor bowl adjacent the outer portion thereof, said partitions defining the inner portion of the respective spaces at the greatest width being perforated for flow of lighter liquid phases therethrough toward the axis whereby said lighter liquid phases pass through a partition on one side of the axis and then flow through the next inner space to the opposite side and through the perforations in the next inner partition, means in said rotor communicating with outer portions of said spaces at their greatest widths for flow of heavier liquid phases in their separated state to the outer portion of the bowl as they are progressively separated from the lighter liquid phases as the lighter liquid phases progress toward the axis of the bowl, and means communicating with the bowl at inner and outer portions for separately discharging lighter and heavier liquids respectively from said rotor.

2. A rotor including a bowl having a wall and an axial shaft for separation of liquids having different specific gravities by centrifugal force comprising, a plurality of radially spaced partition walls within the rotor bowl and surrounding said shaft forming spaces between said partitions with the center of said spaces concentric to the axis of said shaft, said partitions being arranged whereby adjacent partitions are eccentric to said axis in diametrically opposed relation and said spaces therebetween are of progressively increased width from one side to the diametrically opposite side with the greatest width of one space being on the opposite side of the axis to the greatest width of the next adjacent space, means supplying liquids to be separated to the rotor bowl adjacent the wall thereof, passages in the partitions defining the inner portion of the respective spaces at the greatest width for flow of lighter liquid phases therethrough toward the shaft whereby said lighter liquid phases pass through a partition on one side of the axis and then flow through the next inner space to the opposite side and through the passages in the next inner partition, means in said bowl communicating with said spaces for flow of separated heavier liquid phases outwardly toward he wall of the rotor, and means for separately discharging separated heavier liquid and lighter liquid from said rotor.

3. A rotor including a bowl having a wall and an axial shaft for separation of liquids having different specific gravities by centrifugal force comprising, a plurality of radially spaced partition walls within the rotor bowl and surrounding said shaft forming spaces betwen said partitions with the center of said spaces concentric to the axis of said shaft, said partitions being arranged whereby adjacent partitions are eccentric to said axis in diametrically opposed relation and said spaces therebetween are of progressively increased width from one side to the diametrically opposite side with the greatest width of one space being on the opposite side of the axis to the greatest width of the next adjacent space, means supplying liquids to be separated to the rotor bowl adjacent the wall thereof, passages in the partitions defining the inner portion of the respective spaces at the greatest width for flow of lighter liquid phases therethrough toward the shaft whereby said lighter liquid phases pass through a partition on one side of the axis and then flow through the next inner space to the opposite side and through the passages in the next inner partition, means in said bowl communicating with said spaces at their greatest widths for flow of heavier liquid phases outwardly toward the wall of the rotor, the flow of lighter and heavier liquid phases in each space being concurrent, means having communication with the bowl at the outer portion for discharge of the separated heavier liquid phase from the rotor, and means communicating with the bowl at the innermost space for discharge of separated lighter liquid phase from the rotor.

4. A rotor including a bowl having a wall and an axial shaft for separation of liquids having different specific gravities by centrifugal force comprising, a plurality of radially spaced partition walls within the rotor bowl and surrounding said shaft forming spaces between said partitions with the center of said spaces concentric to the axis of said shaft, said partitions being arranged whereby adjacent partitions are eccentric to said axis in diametrically opposed relation and said spaces therebetween are of progressively increased width from one side to the diametrically opposite side with the greatest width of one space being on the opposite side of the axis to the greatest width of the next adjacent space, means supplying liquids to be separated to the rotor bowl adjacent the wall thereof, passages in the partitions defining the inner portion of the respective spaces at the greatest width for flow of lighter liquid phases therethrough toward the shaft whereby said lighter liquid phases pass through a partition on one side of the axis and then flow through the next inner space to the opposite side and through the passages in the next inner partition, means in said passages in said bowl communicating with outer portions of alternate spaces at their greatest widths for flow of heavier liquid phases outwardly toward the wall of the rotor, the flow of lighter and heavier liquid phases in each space being concurrent, a heavier liquid phase discharge passage in said shaft, a lighter liquid phase discharge passage in said shaft, means having communication with the bowl at the outer portion for flow of the separated heavier liquid phase to the heavier liquid discharge passage in the shaft for discharge from the rotor, and means communicating with the bowl at the innermost space for flow of separated lighte liquid phase to the lighter liquid discharge passage in the shaft for discharge from the rotor.

5. A rotor including a bowl having a wall and an axial shaft for separation of liquids having different specific gravities by centrifugal force comprising, a plurality of radially spaced partition walls within the rotor bowl and surrounding said shaft forming spaces between said partitions with the center of said spaces concentric to the axis of said shaft, said partitions being arranged whereby adjacent partitions are eccentric to said axis in diametrically opposed relation and said spaces therebetween are of progressively increased width from one side to the diametrically opposite side with the greatest width of one space being on the opposite side of the axis to the greatest width of the next adjacent space, means supplying liquids to be separated to the rotor bowl adjacent the wall thereof, passages in the partitions defining the inner portion of the respective spaces at the greatest width for flow of lighter liquid phases therethrough toward the shaft whereby said lighter liquid phases pass through a partition on one side of the axis and then flow through the next inner space to the opposite side and through the passages in the next inner partition, heavier liquid flow passages communicating outer portions of alternate spaces at their greatest widths for flow of heavier liquid phases toward the wall of the rotor, said heavier liquid flow passages being arranged with one passage communicating a space to the next outer alternate space for flow thereto and with a second passage communicating with said next alternate space for flow therefrom, said second passage being spaced from said one passage longitudinally of the axis of the bowl, the flow of lighter and heavier liquid phases in each space being concurrent, means having communication with the bowl at the outer portion for discharge of the separated heavier liquid phase from the rotor, and means communicating with the bowl at the innermost space for discharge of separated lighter liquid phase from the rotor.

6. A rotor including a bowl having a wall and an axial shaft for separation of liquids having different specific gravities by centrifugal force comprising, a plurality of radially spaced partition walls within the rotor bowl and surrounding said shaft forming spaces between said partitions with the center of said spaces concentric to the axis of said shaft, said partitions being arranged whereby adjacent partitions are eccentric to said axis in diametrically opposed relation and said spaces therebetween are of progressively increased width from one side to the diametrically opposite side with the greatest width of one space being on the opposite side of the axis to the greatest width of the next adjacent space, spaced rods each having one end secured to the shaft and the other end thereof secured to said wall of the bowl, said rods extending through the partitions in an axial plane that extends through the spaces at their greatest and smallest widths, means supplying liquids to be separated to the rotor bowl adjacent the wall thereof, passages in the partitions defining the inner portion of the respective spaces at the greatest width for flow of lighter liquid phases therethrough toward the shaft whereby said lighter liquid phases pass through a partition on one side of the axis and then flow through the next inner space to the opposite side and through the passages in the next inner partition, passages in said rods communicating outer portions of alternate spaces at their greatest widths for flow of heavier liquid phases toward the wall of the rotor, said passages being arranged in one rod for flow from a space to the next outer alternate space and in a second rod for flow from said next alternate space with said second rod being spaced from said one rod longitudinally of the axis of the bowl, the flow of lighter and heavier liquid phases in each space being concurrent, means having communication with the bowl at the outer portion for discharge of the separated heavier liquid phase from the rotor, and means communicating with the bowl at the innermost space for discharge of separated lighter liquid phase from the rotor.

7. A rotor including a bowl having a wall and an axial shaft for separation of liquids having different specific gravities by centrifugal force comprising, a plurality of radially spaced partition walls within the rotor bowl and surrounding said shaft forming spaces between said partitions with the center of said spaces concentric to the axis of said shaft, said partitions being arranged whereby adjacent partitions are eccentric to said axis in diametrically opposed relation and said spaces therebetween are of progressively increased width from one side to the diametrically opposite side with the greatest width of one space being on the opposite side of the axis to the greatest width of the next adjacent space, spaced rods each having one end secured to the shaft and the other end thereof secured to said wall of the bowl, said rods extending through the partitions in an axial plane that extends through the spaces at their greatest and smallest widths, means supplying liquids to be separated to the rotor bowl adjacent the wall thereof, passages in the partitions defining the inner portion of the respective spaces at the greatest width for flow of lighter liquid phases therethrough toward the shaft whereby said lighter liquid phases pass through a partition on one side of the axis and then flow through the next inner space to the opposite side and through the passages in the next inner partition, passages in said rods communicating outer portions of alternate spaces at their greatest widths for flow of heavier liquid phases toward the wall of the rotor, said passages being arranged in one rod for flow from a space to the next outer alternate space and in a second rod for flow from said next alternate space with said second rod being spaced from said one rod longitudinally of the axis of the bowl, the flow of lighter and heavier liquid phases in each space being concurrent, a heavier liquid phase discharge passage in said shaft, a lighter liquid phase discharge passage in said shaft, means having communication with the bowl at the outer portion for flow of the separated heavier liquid phase to the heavier liquid discharge passage in the shaft for discharge from the rotor, and means communicating with the bowl at the innermost space for flow of separated lighter liquid phase to the lighter liquid discharge passage in the shaft for discharge from the rotor.

8. A phase separator including a vertically disposed rotor bowl having a cylindrical wall and a bottom and an axial shaft for separation of liquids having different specific gravities by centrifugal force comprising, a plurality of radially spaced partition walls within the rotor bowl and surrounding said shaft forming spaces between said partitions with the center of the spaces concentric to the axis of said shaft, said partitions being arranged whereby adjacent partitions are eccentric to said axis in diametrically opposed relation and said spaces therebetween are of progressively increased width from one side to the diametrically opposite side with the greatest width of one space being on the opposite side of the axis to the greatest width of the next adjacent space, a cover for said bowl having an opening for the shaft, said shaft extending above said bowl and having a longitudinal bore in its upper end for introduction of liquid to be separated, said cover having radially extending bores intersecting said bore in the shaft and extending outwardly and communicating with the bowl near the bowl wall for flow of liquid to be separated to said bowl, said shaft extending below the bowl, means supporting the lower end of the shaft, spaced rods extending outwardly from both sides of said shaft with each rod having one end secured to the shaft and the other end thereof secured to said wall of the bowl, said rods extending through the partitions in an axial plane that extends through the spaces at their greatest and smallest widths, said rods having vertical openings adjacent outer portions of alternate spaces at their greatest widths and communicating therewith, said rods having horizontal bores intersecting said vertical openings with said vertical and horizontal bores being arranged in one rod for flow of separated heavier liquid phases from one space to the next outer alternate space and in a second rod for flow from said next outer alternate space for progressive movement of said heavier liquid phases toward the wall of the rotor bowl, the partitions defining the inner portion of the respective spaces at the greatest width being perforated and spaced from the rods for flow of lighter liquid phases through said perforations toward the shaft with the same partition on the other side of the axis being unperforated and closed around said rods whereby lighter liquid phases pass through the perforations of a partition on one side of the axis and then flow through the next inner space to the opposite side and through perforations in the next inner partition with the heavier liquid phases in said next inner space passing through the vertical openings and horizontal bore in the rod to the next alternate outer space, the flow of lighter and heavier liquid phases in each space being concurrent, means communicating with the outer portion of the bowl for discharging separated heavier liquid phase from the rotor, and means communicating with the bowl at the innermost space for discharge of separated lighter liquid phase from the rotor.

9. A phase separator including a vertically disposed rotor bowl having a cylindrical wall and a bottom and an axial shaft for separation of liquids having different specific gravities by centrifugal force comprising, a plurality of radially spaced partition walls within the rotor bowl and surrounding said shaft forming spaces between said partitions with the center of the spaces concentric to the axis of said shaft, said partitions being arranged whereby adjacent partitions are eccentric to said axis in diametrically opposed relation and said spaces therebetween are of progressively increased width from one side to the diametrically opposite side with the greatest width of one space being on the opposite side of the axis to the greatest width of the next adjacent space, a cover for said bowl having an opening for the shaft, said shaft extending above said bowl and having a longitudinal bore in its upper end for introduction of liquid to be separated, said cover having radially extending bores intersecting said bore in the shaft and extending outwardly and communicating with said bowl near the bowl wall for flow of liquid to be separated to said bowl, said shaft extending below the bowl, means supporting the lower end of the shaft, spaced rods extending outwardly from both sides of the shaft with each rod having one end secured to the shaft and the other end thereof secured to said wall of the bowl, said rods extending through the partitions in an axial plane that extends through the spaces at their greatest and smallest widths, said rods having vertical openings adjacent outer portions of alternate spaces at their greatest widths and communicating therewith, said rods having horizontal bores intersecting said vertical openings with said vertical and horizontal bores being arranged in one rod for flow of separated heavier liquid phases from one space to the next outer alternate space and in a second rod for flow from said next outer alternate space for progressive movement of said heavier liquid phases toward the wall of the rotor bowl, the partitions defining the inner portion of the respective spaces at the greatest width being perforated and spaced from the rods for flow of lighter liquid phases through said perforations toward the shaft with the same partition on the other side of the axis being unperforated and closed around said rods whereby lighter liquid phases pass through the perforations of a partition on one side of the axis and then flow through the next inner space to the opposite side and through perforations in the next inner partition with the heavier liquid phases in said next inner space passing through the vertical openings and horizontal bore in the rod to the next alternate outer space, the flow of lighter and heavier liquid phases in each space being concurrent, means including a discharge bore in the lower portion of said shaft and having communication with the bowl at the outer portion for discharge of the separated heavier liquid phase through said shaft at the bottom of the rotor, means including a second bore in the lower portion of said shaft and having communication with the bowl at the innermost space for discharge of separated lighter liquid phase through the shaft at the bottom of the rotor, a cap enclosing the lower end of said shaft, means in said cap sealingly engaging said shaft in spaced relation longitudinally thereof to define a chamber therebetween having communication with the second discharge bore whereby the lighter liquid phase is received in said chamber, and separate discharge connections in said cap with one having communication with said chamber and the other having communication with said first discharge bore for flow of the separated liquids therefrom.

10. A rotor including a bowl having a wall for separation of liquids having different specific gravities by centrifugal force comprising, a plurality of radially spaced partition walls within the rotor bowl forming spaces between said partitions, said partitions being arranged whereby adjacent partitions are eccentric to the rotor axis in diametrically opposed relation and said spaces therebetween are of progressively increased width from one side to the diametrically opposite side with the greatest width of one space being on the opposite side of the rotor axis to the greatest width of the next adjacent space, means supplying liquids to be separated to the rotor bowl adjacent the wall thereof, passages in the partitions defining the inner portion of the respective spaces at the greatest width for flow of lighter liquid phases therethrough toward the rotor axis whereby liquids pass through a partition on one side of the axis and then move through the next inner space at an accelerated and then at a decelerated speed to the opposite side of the rotor axis where said next inner space has its greater width with heavier liquid phases moving to the outer portion of said space and the lighter liquid phases moving to the inner portion and through passages in the next inner partition, the flow of lighter and heavier liquid phases in each space being concurrent, means in said bowl communicating with outer portions of said spaces at their greatest widths for flow of separated heavier liquid phases outwardly toward the wall of the rotor, and means for separately discharging separated heavier liquid and lighter liquid from said rotor.

References Cited in the file of this patent

UNITED STATES PATENTS

| | | |
|---|---|---|
| 750,079 | Berrigan | Jan. 19, 1904 |
| 1,126,247 | Mason | Jan. 26, 1915 |
| 2,291,849 | Tomlinson | Aug. 4, 1942 |
| 2,840,301 | Podbielniak | June 24, 1958 |